US006884982B2

(12) United States Patent
Beusch

(10) Patent No.: US 6,884,982 B2
(45) Date of Patent: Apr. 26, 2005

(54) METHODS AND APPARATUS FOR IMPROVING RESOLUTION AND REDUCING THE EFFECTS OF SIGNAL COUPLING IN AN ELECTRONIC IMAGER

(75) Inventor: John U. Beusch, Stow, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 27 days.

(21) Appl. No.: 10/078,231

(22) Filed: Feb. 19, 2002

(65) Prior Publication Data

US 2003/0164442 A1 Sep. 4, 2003

(51) Int. Cl.[7] .............................................. H01L 27/00
(52) U.S. Cl. .............................. 250/208.1; 250/208.2; 250/214 R; 382/299; 382/300
(58) Field of Search ........................... 250/208.1, 226, 250/208.2, 214, 370.01, 370.09; 348/538; 358/1.2, 3.07, 3.08, 525, 471, 482; 382/299, 300, 288

(56) References Cited

U.S. PATENT DOCUMENTS

| | | | | |
|---|---|---|---|---|
| 4,710,817 A | * | 12/1987 | Ando ........................... | 348/310 |
| 4,979,221 A | * | 12/1990 | Perryman et al. ........... | 382/288 |
| 5,754,690 A | * | 5/1998 | Jackson et al. ............. | 382/199 |
| 5,812,690 A | * | 9/1998 | Fordham ..................... | 382/100 |
| 6,329,658 B1 | | 12/2001 | Mestais et al. | |

FOREIGN PATENT DOCUMENTS

| | | |
|---|---|---|
| EP | 0 637 759 | 2/1995 |
| WO | WO 01/27656 | 4/2001 |

OTHER PUBLICATIONS

Alderighi et al. Implementing Photon Event Recognition Algorithms on a 3D–Flow System, Algorithms and Architectures for Parallel Processing. 1995. ICAPP 95. IEEE First ICA/sup 3/PP. IEEE First International Conference on ,vol. 2, Apr. 19–21, 1995, Pages.*

Pivovaroff et al. Measurement of the Subpixel Structure of AXAF CCD's, IEEE Transactions on Nuclear Science, vol. 45, No. 2, Apr. 1998.*

Yoshita et al. Improvement of the Position Resolution of the CCD for X–Ray Use. IEEE Transactions on Nuclear Science, vol. 46, No. 2, Apr. 1999.*

Alderighi et al., Evidence: an FPGA–based system for photon Event IDENtification and Centroiding. Field–Programmable Custom Computing Machines, 2000 IEEE Symposium on , Apr. 17–19, 2000, pp. 259–266.*

(Continued)

Primary Examiner—Thanh X. Luu
Assistant Examiner—Stephen Yam
(74) Attorney, Agent, or Firm—Daly, Crowley & Mofford, LLP

(57) ABSTRACT

An electronic imager includes a detector array, a plurality of processing circuits, each responsive to an output signal from a respective detector element of the array and to a determination that signal coupling in general or charge sharing in particular occurred. The imager further includes a shared channel circuit coupled to at least two processing circuits for receiving an output signal from the processing circuits in response to a determination that signal coupling has occurred and for generating an output signal in response to the received signals. The shared channel circuit further directs the output signal to an image sub-pixel, wherein a plurality of sub-pixels are associated with each radiation sensitive element.

8 Claims, 10 Drawing Sheets

OTHER PUBLICATIONS

Llopart et al., "Medipix2, a 64k pixel read out chip with 55 mu m square elements working in single photon counting modde", 2001 IEEE Nuclear Science Symposium Conference Record, pp. 1484–1488.

International Search Report for PCT/US02/32856.

M. Lundqvist et al., "Computer Simulations and Performance Measurements on a Silicon Strip Detector for Edge–On Imaging", IEEE Transaction on Nuclear Science, vol. 47, no. 4, Aug. 2000, pp. 1487–1492.

R. Turchetta et al., "High Spatial Resolution Silicon Read–Out System for Single Photon X–Ray Detection", IEEE Conference Record, vol. 1, 1993, pp. 435–439.

David B. Kasle et al., "An Image Decoding ASIC for Space–Based Applications", IEEE, 1991, pp. 86–91.

David B. Kasle, "High Resolution Decoding Techniques and Single–Chip Decoders for Multi–Anode Microchannel Arrays", SPIE Untraviolet Technology III, vol. 1158, 1989, pp. 311–318.

DG Marks et al., "A 48×48 CdZnTe Array with Multiplexer Readout", IEEE Transactions on Nuclear Science, vol. 43, no. 3, Jun. 1996, pp. 1253–1259.

Y.F. Du, et al., "Monte Carlo Investigation of the Charge Sharing Effects in 3–D Position Sensitive CdZnTe Gamma Ray Spectrometers", IEEE Transactions on Nuclear Science, vol. 46, no. 4, Aug. 1999, pp. 844–847.

F. Arfelli et al., "Digital Mammography at the Trieste Synchroton Light Source", IEEE Transactions on Nuclear Science, vol. 43, no. 3, Jun. 1996, pp. 2061–2067.

John Vallerga et al., "High Resolution (<10 micron) Photon Couting Intensified CCD", SPIE The International Society for Optical Engineering, vol. 3019, Feb. 1997, pp. 156–167.

B. Ludewigt et al., "Progress in Multi–Element Silicon Detectors for Synchrotron XRF Applications", Lawrence Berkeley National Laboratory, pp. 584–587.

C. Rossington Tull et al., "Spectral Response of Multi–Element Silicon X–Ray Detectors", IEEE Transactions on Nuclear Science, vol. 45, no. 3, 1998, pp. 421–427.

E. Beuville et al., "High Resolution X–Ray Imaging using a Silicon Strip Detector", IEEE Transactions on Nuclear Science, vol. 45, no. 6, Dec. 1998, pp. 3059–3063.

* cited by examiner

METHODS AND APPARATUS FOR IMPROVING RESOLUTION AND REDUCING THE EFFECTS OF SIGNAL COUPLING IN AN ELECTRONIC IMAGER

STATEMENTS REGARDING FEDERALLY SPONSORED RESEARCH

This invention was made with government support under Contract No. F19628-00-C-0002 awarded by the Air Force. The government has certain rights in the invention.

CROSS-REFERENCE TO RELATED APPLICATIONS

Not applicable.

FIELD OF THE INVENTION

This invention relates to an electronic imager and more particularly to electronic imaging apparatus and techniques for improving resolution and reducing the effects of signal coupling between channels.

BACKGROUND OF THE INVENTION

Modern imaging has its roots in the nineteenth century with the advent of film which is used today for diverse applications, including generating common photographs and radiographic medical images using x-rays. During the past ten to twenty years, electronic imaging has become common in many fields and has totally replaced film systems in some applications. The term "electronic imaging" as used herein includes electro-optical imaging in the infrared, visible, and ultraviolet regions of the spectrum, and also in the higher energy regions of the spectrum including soft and hard x-rays and gamma-rays.

In its simplest form, electronic imaging is performed by intercepting radiation in the form of photons from an object of interest or scene to be viewed. The photons may be generated by various sources, such as astronomical sources including the sun and stars, other sources of soft x-rays (photons with energy below 10 kev), x-ray tubes and other sources of hard x-rays (photons with energy equal to or above 10 kev), and gamma ray isotopes or other high energy sources of photons above 50 kev. The photons incident on the object to be viewed can be provided directly from an energy source or can be reflected by one or more objects.

Prior to interception, photons can travel or transit through the earth's atmosphere, the near vacuum of outer space, water, tissue or organs or other elements of a patient in medical applications, other objects to be imaged and examined, or any other medium which may or may not degrade the image or provide information of interest. The photons may pass through lenses, be reflected by mirrors, or be affected by baffles or other components. The intercepted photons may be from one band of the electromagnetic spectrum, from more than one band (i.e., multi-spectral), from many bands (i.e., hyperspectral), or from all bands.

In electronic imaging, the interception of photons is accomplished by imaging, or detector arrays. Detector arrays include a plurality of detector elements, sometimes referred to as pixels, arranged in a linear array or two-dimensional array. The intercepted photons cause analog electrical signals in various forms, such as a voltage, current, or charge, to be generated by the detector elements. Commonly available detector array configurations for electronic imaging include point scan, slit scan, slot scan (sometimes referred to as "push broom") and fixed two-dimensional image receptors. Such detector arrays are often located in vehicles including aircraft and spacecraft, medical facilities, airports, industrial facilities, homes, offices, and a variety of other locations and can be subsystems of cameras or other equipment.

In many applications, the detector array is enabled to intercept photons for an interval of time (i.e., an imaging interval) and after that interval, the resulting electrical signal generated in each detector element is read out in some fashion and presented to a user or operator of the imager and/or is stored in a memory device for further image processing. It is sometimes necessary or desirable to measure detector output signals many times during a single imaging interval and compute a function of the measured values. For example, in an x-ray detection system described in U.S. Pat. No. 5,665,969 entitled X-RAY DETECTOR AND METHOD FOR MEASURING ENERGY OF INDIVIDUAL X-RAY PHOTONS FOR IMPROVED IMAGING OF SUBJECTS USING REDUCED DOSE, which patent is hereby incorporated herein by reference in its entirety, a weighted sum function of many single photon measurements is computed during each imaging interval.

When a signal couples to more than one imager channel or a signal from one channel couples to another channel, image quality can be adversely affected. Charge sharing is one type of signal coupling in which a single photon impacts more than one detector element, resulting in signal detection in more than one channel. In a photon counting system, charge sharing can cause an extra photon to be counted. Charge sharing can be a more significant problem in systems in which a signal processing function is performed on the detector output signals. For example, in the above-referenced U.S. Pat. No. 5,665,969, the weighting is a function of signal amplitude and, since a detector output signal resulting from charge sharing does not accurately represent the photon energy, weighting can be inaccurately applied.

SUMMARY OF THE INVENTION

According to the invention, an electronic imager includes a detector array comprising a plurality of radiation sensitive elements, a plurality of processing circuits, each responsive to an output signal from a respective radiation sensitive element for generating an output signal and to a signal present indicator from at least one other processing circuit associated with an adjacent radiation sensitive element for determining whether signal coupling has occurred. The imager further includes a shared channel circuit coupled to at least two processing circuits for receiving the output signal from the at least two processing circuits in response to a determination that signal coupling has occurred and generating an output signal in response to the received signals. The output signal is directed to a sub-pixel, wherein a plurality of sub-pixels are associated with each radiation sensitive element, or pixel.

With this arrangement, a relatively simple and fast imaging circuit is provided which reduces the effects of signal coupling and improves image resolution by the use of sub-pixels in the generated image. These advantages are achieved in the imager read out apparatus itself, rather than in a post-processor, thereby permitting substantially "real-time" processing and reducing or eliminating post-processor requirements and the need for storage of the read out signals for subsequent post-processing. Further, the simplicity of the circuitry permits large numbers of detector output signals to be processed without concern for post-processor computational capability and capacity.

Any number of sub-pixels may be used to improve image resolution to different degrees. In one illustrative embodiment, there are four times as many sub-pixels as detector elements, thus, resulting in a four times, or 300% resolution improvement. In this case, each shared channel circuit is associated with three sub-pixels, is located between two adjacent processing circuits, and includes a comparator for comparing the amplitude of the received signals and for directing its output signal to a selected one of the sub-pixels in response to the comparison. In general, the output signal is directed to the sub-pixel closest to the processing circuit providing the greater amplitude signal unless the two signals are substantially equal, in which case the output signal is directed to the center-most of the three sub-pixels.

The described imager can be used in photon counting applications and in applications in which the image is generated based on signal amplitude, in which case amplitude reconstruction is performed. In a photon counting imager, the output signal of the shared channel circuit increments a counter by one for each received photon. In one illustrative amplitude reconstruction embodiment, each shared channel circuit includes a summing circuit for summing the received signals in order to reconstruct the signal amplitude which would have resulted had signal coupling not occurred and the signal appeared in only one processing circuit.

Preferably, each processing circuit is associated with a sub-pixel which receives an output signal in the absence of signal coupling. This "straight-through" path provides for image processing in the absence of signal coupling.

Image compensation may be performed in order to compensate for the tendency of the sub-pixels to accumulate significantly different amounts of data. One image compensation technique is the adjustment of signal amplitude in each image sub-pixel. Another form of image compensation is the adjustment of the size and/or shape of the image sub-pixels. Image compensation may be based on predetermined rules, modeling and/or measurement of the detector array.

Also described is a method for providing an image including the steps of generating a signal in a detector element arranged in an array of detector elements in response to impact by a photon, determining if energy from the photon impacts more than one detector element, and if energy from the photon impacts more than one detector element, generating in substantially real time an output signal in response to the signals generated in the more than one detector element. The output signal is directed to a sub-pixel, wherein a plurality of sub-pixels are associated with a detector element, or pixel.

BRIEF DESCRIPTION OF THE DRAWINGS

The foregoing features of this invention, as well as the invention itself, may be more fully understood from the following description of the drawings in which.

DESCRIPTION OF THE PREFERRED EMBODIMENT

Figure 1:
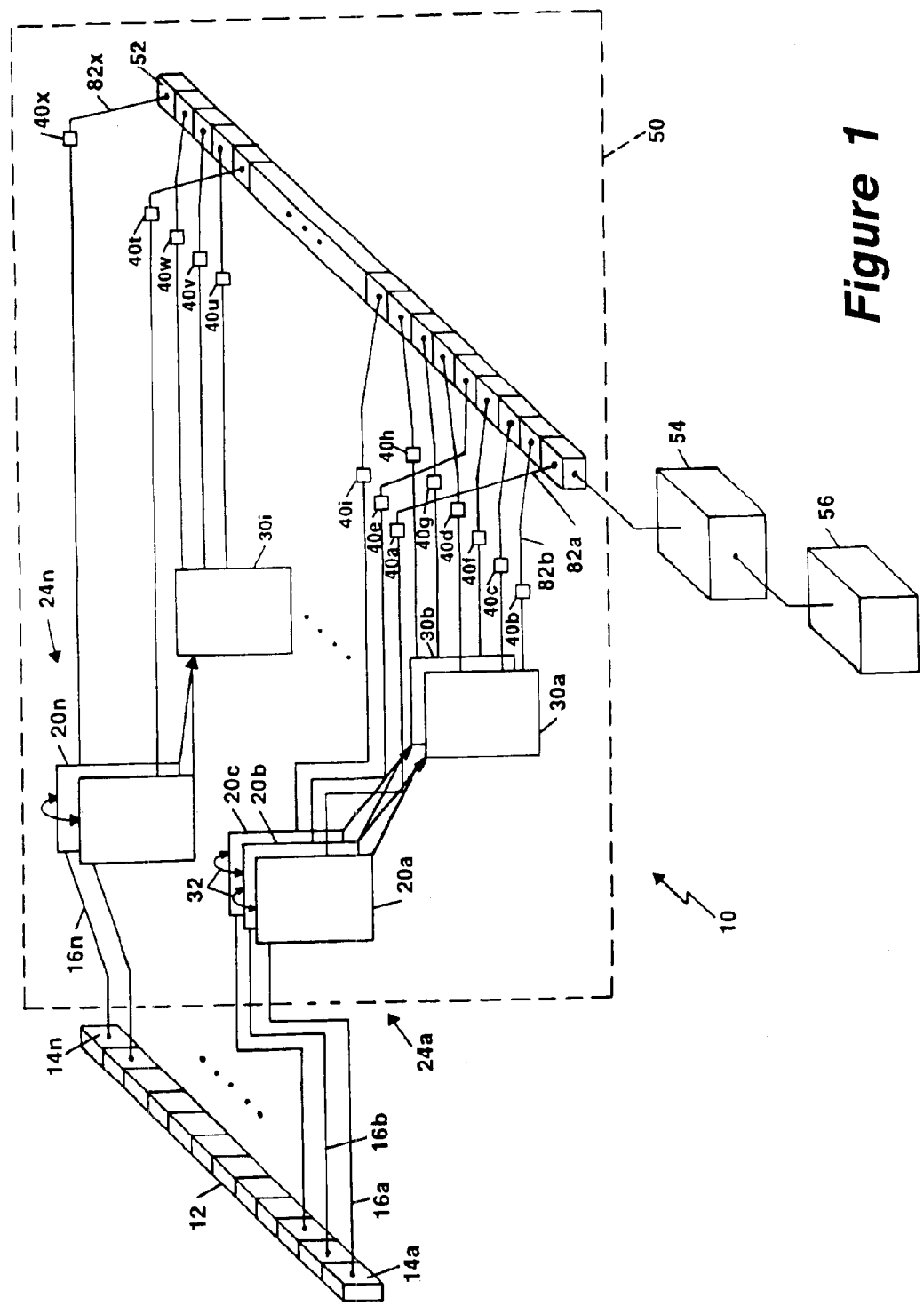
FIG. 1 is a schematic of a one-dimensional electronic imaging system providing improved resolution and reduced effects of signal coupling according to the invention.

Referring to FIG. 1, an electronic imaging system 10 includes an imaging array 12 containing a plurality of radiation sensitive detector elements 14a–14n, each representing an image pixel, and a plurality of processing circuits 20a–20n, each responsive to a signal 16a–16n from a respective detector element and to a signal present indicator 32 from at least one other processing circuit associated with an adjacent detector element. The image processing circuitry 50 can be partitioned into channels 24a–24n, each of which accepts an input from at least one detector element 14a–14n and includes a processing circuit 20a–20n for processing the respective input signal(s). Each processing circuit 20a–20n samples its input at a sampling interval short enough, or equivalently at a sampling rate high enough, that only one signal event is likely to occur on a channel during the sampling interval (i.e., that the probability of a plurality of such events occurring in a sampling interval is negligibly small). For example, such a signal event could occur on a channel, e.g., channel 24b, from a photon arrival that only causes a signal in that particular channel (i.e., no signal coupling) or from a photon arrival that causes outputs on both the particular channel and either of the two neighboring channels, e.g., 24a or 24c, (i.e., signal coupling). The sampling interval is short enough that the probability that more than one of any of these signal events occur in a sampling interval is negligible.

The signal present indicator 32 indicates whether or not a signal is generated by the detector element of the channel generating the indicator (i.e., whether or not a signal is detected on the respective channel). With sufficiently short sampling intervals, signal coupling occurs when signals are detected on more than one channel 24a–24n. One type of signal coupling, referred to as charge sharing, occurs when energy from a single photon impacts more than one detector element 14a–14n. It will be appreciated by those of ordinary skill in the art that the invention is applicable to other types of signal coupling as well, such as when a detector output signal on one of signal lines 16a–16n couples to another signal line 16a–16n.

The imager further includes a plurality of shared channel circuits 30a–30i and a plurality of counters 40a–40x. Each shared channel circuit 30a–30i is coupled to at least two processing circuits 20a–20n for receiving a signal from the processing circuits when a determination is made that signal coupling has occurred. In response to the received signals, the shared channel circuits 30a–30i generate an output signal and direct the output signal to a selected counter 40a–40x. As will become apparent, in the absence of signal coupling, the output signal of a processing circuit 20a–20n is coupled directly to a counter associated with the respective channel. In the presence of signal coupling, the processing circuit 20a–20n couples the output signal to a shared channel circuit 30a–30i and the shared channel circuit generates and directs an output signal to a counter.

The imager 10 further includes a shift register 52, a post-processor 54, and a display 56, as shown. The output signal 82a–82x of each counter 40a–40x is coupled to the shift register 52 or other signal collection mechanism which collects and passes the data to a computer 54 or other post-processing system, element and/or to an operator. The data collection function of the shift register 52 may be performed by a variety of logic or processing means depending on the application, including but not limited to more general registers, accumulators, storage or memory devices. The functions performed by the computer 54 may include further processing, analysis, and/or storage and may be performed by a variety of computational or processing means depending on the application, including but not limited to hard-wired or programmable processors, microprocessors or array processors. Alternatively, the functions performed by post-processor 54 may be omitted and the data passed directly to a display 56 or other system element.

The image provided on the display 56 is comprised of a plurality of sub-pixels, each corresponding to a portion of a pixel. Thus, a plurality of sub-pixels are associated with each pixel, and also with each detector element 14a–14n, resulting in more sub-pixels than detector elements 14a–14n. Each counter 40a–40x generates an image signal 82a–82x for coupling to a sub-pixel of the resulting image through the shift register 52 and the post-processor 54.

With this arrangement, a relatively simple and fast imaging circuit is provided for reducing the effects of signal coupling and improving resolution by the use of sub-pixels in the generated image. These advantages are achieved in the imager read out apparatus itself, rather than in a post-processor, thereby permitting substantially "real-time" processing and reducing or eliminating post-processor requirements and the need for storage of the read out signals for subsequent post-processing. Further, the simplicity of the circuitry permits large numbers of detector output signals to be processed without concern for post-processor computational capability.

More particularly, each detector element 14a–14n of the linear array 12 provides an analog output signal 16a–16n in response to various types of incident radiation in various wavelength bands, such as infrared, visible, ultraviolet, soft x-ray, hard x-ray, gamma ray and other high-energy particle bands. The detector output signals 16a–16n may be indicative of the number of incident photons or particles during a particular time interval, the energy level of an incident photon or particle, or an accumulation of energy levels from a plurality of incident photons or particles. Standard usage refers to the basic quantity of energy in some wavelength bands as a photon and in others as a particle. Such terms are used interchangeably herein, so when a photon is referred to it is understood to mean a photon or particle. Illustrative detector elements 14a–14n include, but are not limited to charge-coupled devices (CCDs), photon capture layers of a semiconductor material which form a detector for visible, ultraviolet, or soft x-ray photons, a silicon microstrip detector, and a semiconductor device of high Z or high atomic weight material, medium Z or medium atomic weight material including but not limited to gallium arsenide, cadmium zinc telluride, mercury cadmium telluride, silicon, gallium, and indium.

Each detector output signal 16a–16n is coupled by a coupling mechanism to a processing circuit 20a–20n, as shown. For simplicity of illustration, only detector elements $14_a$, $14_b$, $14_c$, $14_m$, and $14_n$ are shown to provide analog detector output signals 16a, 16b, 16c, 16m, and 16n for processing, respectively. The coupling mechanisms which carry the signals may take various forms depending on the type of imaging array. For example, the coupling mechanism may include portions of semiconductor material or metallic bonding pads comprising or connected to the pixels, conductive traces, indium "bumps" or elements of a read-out integrated circuit (ROIC) such as a CCD.

Although the processing circuits 20a–20n are shown to correspond one-to-one to detector elements 14a–14n, this need not be the case. Any number of processing circuits can be implemented in a single unit which can be connected in various ways to detector elements including but not limited to pixel-by-pixel as shown, or by groups of pixels. Also, the division of processing functions performed by the processing circuits 20a–20n and the shared channel circuits 30a–30i can be varied and the functions of these circuits can be implemented in any number of physical units. Further, in the illustrative embodiment, it is contemplated that the processing circuits 20a–20n are identical, the shared channel circuits 30a–30i are identical, and the counters 40a–40x are identical. However, it will be appreciated by those of ordinary skill in the art that although certain efficiencies may be gained by using identical circuits in terms of cost and circuit complexity, this is not necessary and does not limit the scope of the invention.

Figure 2:
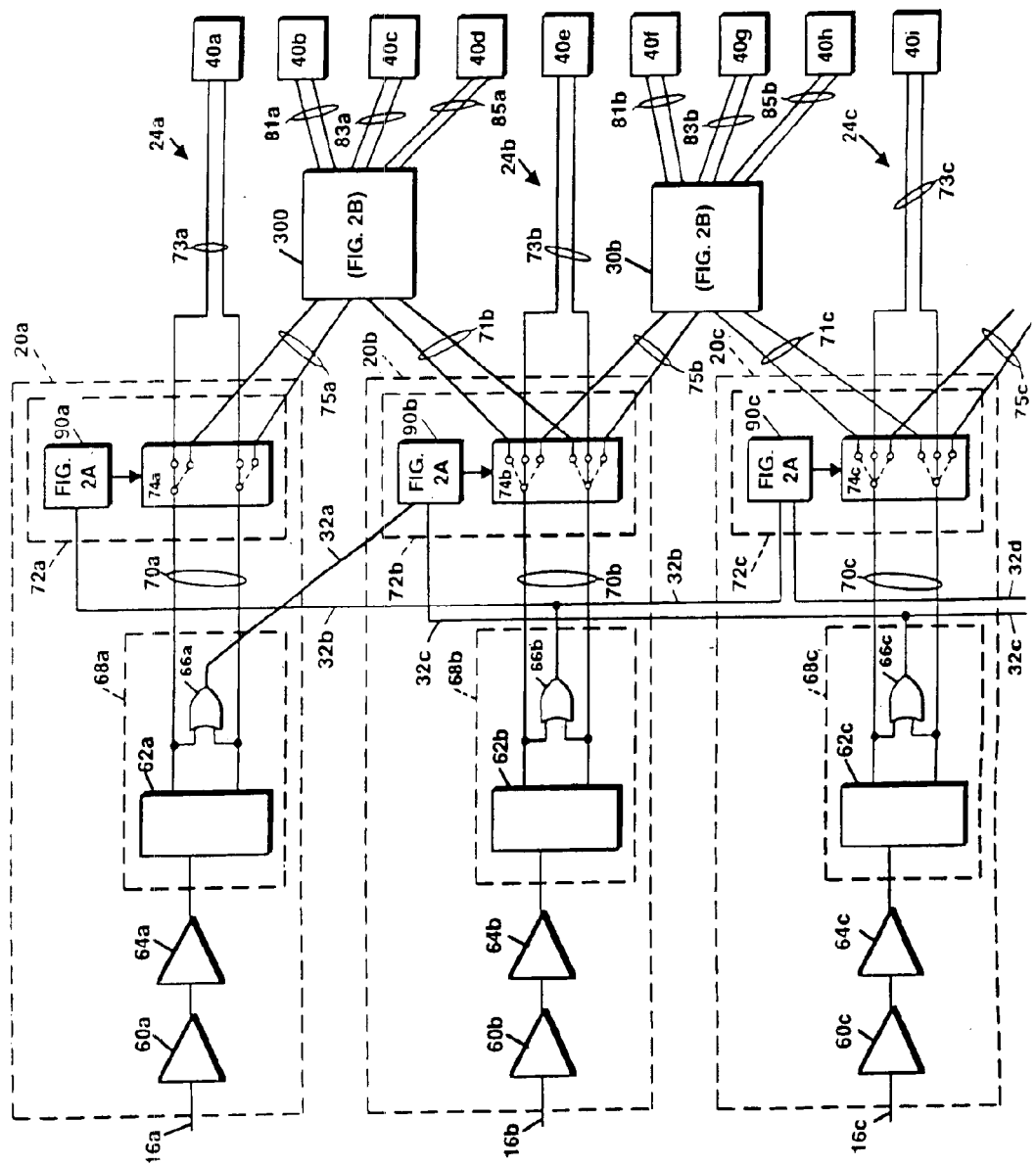
FIG. 2 is a schematic of illustrative processing circuitry for use in an amplitude reconstruction implementation of the system of FIG. 1.
Figure 2A:
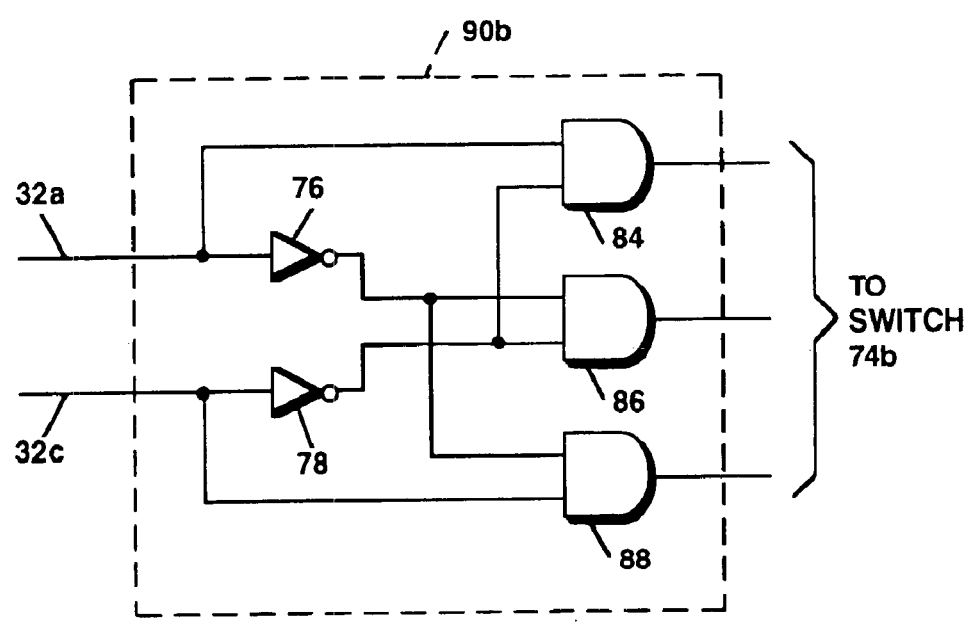
FIG. 2A is a schematic of an illustrative logic circuit for controlling the switch of a channel processor of FIG. 2.
Figure 2B:
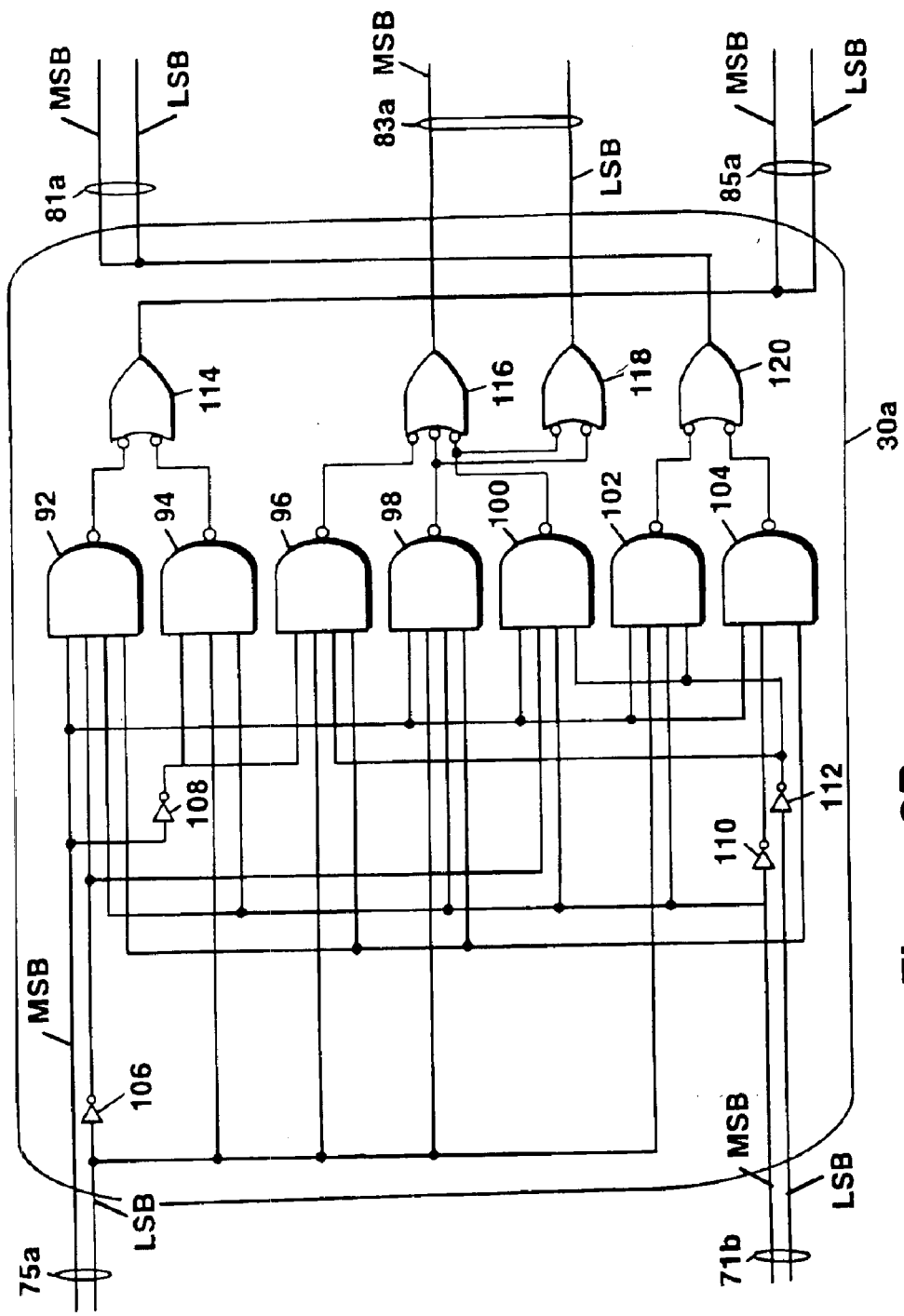
FIG. 2B is a schematic of an illustrative shared channel circuit of FIG. 2.

The imager 10 may employ various image processing techniques, such as photon counting (FIGS. 3 and 3A) or imaging based on the energy level of incident photons (FIGS. 2, 2A, and 2B). The imager may further include circuitry for performing a signal processing function on detector output signals, such as the weighting function described in the above-referenced U.S. Pat. No. 5,665,969 or the use of non-uniform thresholds in an A/D converter circuit as described in a co-pending U.S. patent application Ser. No. 09/977,132 entitled "METHOD AND APPARATUS FOR PERFORMING SIGNAL PROCESSING FUNCTIONS IN AN ELECTRONIC IMAGER", assigned to the assignee of the present invention and hereby incorporated herein by reference in its entirety.

Referring to FIG. 2, a portion of the processing circuitry 50 of FIG. 1 associated with three channels 24a–24c is shown. With the circuitry of FIG. 2, the energy level of incident photons is used to generate the resulting image. In this type of system, the circuitry responds to signal coupling by reconstructing the amplitude of the received signal. Stated differently, received signals are combined in order to reconstruct a single signal having an amplitude which would result if the photon had impacted only one detector element (i.e., if signal coupling had not occurred).

Each processing circuit 20a–20c includes an amplifier 60a–60c, a signal shaper 64a–64c, an analog-to-digital (A/D) converter circuit 68a–68c, and a channel processor 72a–72c, respectively, coupled as shown. The amplifier and signal shaper are conventional components for amplifying and shaping the respective detector output signal 16a–16c in order to improve processing results. However, depending on signal levels, noise levels, and other characteristics of the detector output signal, the amplifier and/or shaper may be omitted. In some applications, the signal shaper 64a–64c may be replaced by a sample and hold circuit. In any case, the sampling interval is short enough that the probability of multiple signal events occurring on a channel in a sampling interval is negligibly small.

The processing circuits 20a–20c will be described further in connection with exemplary processing circuit 20a. The A/D converter circuit 68a contains an A/D converter 62a to convert the detector output signal 16a into a digital signal 70a for further processing and further includes an OR gate 66a to generate a signal 32a, referred to herein as the signal present indicator, which is indicative of whether or not a signal is detected on channel 24a.

The illustrative A/D converter 62a is a two bit converter providing an output signal 70a having two bits 70a MSB (i.e., the most significant bit) and 70a LSB (i.e., the least significant bit). A digital output signal 70a of 00 indicates the absence of a signal on the respective channel 24a, and digital signals 01, 10, and 11 indicate the presence of signals of progressively larger amplitudes.

The signal present indicator 32a is provided at the output of the OR gate 66a. Thus, the signal present indicator is at a logic high level if either bit of signal 70a is a one, indicating the presence of a signal received by the respective channel. Alternatively, if both bits of signal 70a are zero, then the signal present indicator 32a is at a logic low level, indicating the absence of a signal on the respective channel.

It will be appreciated by those of ordinary skill in the art that the level of the lowest threshold signal provided to the A/D converter 62a may be selected and varied to suit particular system characteristics including detector design. In general, the threshold signal level is selected and the detector design is specified so that signal coupling that might occur with respect to more than two detector elements 14a–14n has negligible impact. Thus, the threshold level is set high enough so that the threshold is not exceeded by a low level signal as may be coupled from a non-adjacent channel.

The two bit A/D converter 62a represents the fewest number of bits that can be used to achieve improved resolution, although even a one-bit converter may be useful in some cases. With an A/D converter of a small number of bits, particularly only one bit, the distinction between digital and analog signals becomes rather arbitrary and, furthermore, digital electronic systems can be considered to deal with analog electrical signals. Although many circuits described herein use digital notation, it will be appreciated by those of ordinary skill in the art that there are both digital and analog ways of implementing circuits and thus, the methods disclosed herein apply to both digital and analog implementations.

A larger number of bits in the A/D converter would provide improved results at the cost of more circuit complexity for a given number of channels. The implementation would be similar to that described in FIGS. 2 and 3, although certain aspects may require modification. For example, a larger number of bits would require more complex logic than shown in FIG. 2B. This logic could provide more precise comparison of the quantities represented by the larger number of bits and thus more accurate assignment of signals to sub-pixels. Alternatively, if detector properties permit, this logic could provide comparison and assignment to a larger number of sub-pixels than the three sub-pixels shown in FIG. 2 and thus provide more resolution improvement. If signal coupling occurs frequently, then using an A/D converter with more than two bits may lead to simplified hardware if adequate performance can be achieved with fewer elements in detector array 12, since fewer channels including amplifiers, signal shapers, and A/D converters, would be required.

The signal present indicator 32a–32c is coupled to the channel processor 72a–72c of the neighboring, or adjacent channels. Thus, for example, the signal present indicator 32b generated in the A/D converter circuit 68b of channel 24b is coupled to the channel processor 72a of adjacent channel 24a and to the channel processor 72c of adjacent channel 24c, as shown. It will be appreciated by those of ordinary skill in the art that while the signal present indicator is coupled directly between neighboring processing circuits 20a–20n, this need not be the case. In other words, the signal present indicator can be coupled from each channel to its neighboring channels through an alternate route, such as through the shared channel circuits 30a–30i.

The digital output signal 70a of the A/D converter 62a is coupled to the channel processor 72a, as shown. The channel processor 72a is operative to determine, based on received signal present indicators 32a –32n, whether or not signal coupling has occurred and to direct the digital signal according to the result of the determination.

The illustrative channel processor 72a includes a two-pole, two position switch 74a controlled by a logic circuit 90a for directing the digital signal 70a to a selected, further circuit element. Specifically, the channel processor 72a is capable of directing the digital signal 70a directly to a counter 40a of the respective channel 24a via a "straight-through" path 73a when signal coupling has not occurred (i.e., in the absence of signal coupling) or to shared channel circuit 30a via a signal line 75a when signal coupling has occurred (i.e., in the presence of signal coupling). More generally, through a two-pole, three position switch (e.g., switch 74b) a channel processor is coupled directly to a respective counter and also to two shared channel circuits and, in the presence of a signal coupling directs the digital output signal to the shared channel circuit which is shared with the adjacent channel on which a signal is detected as determined by the signal present indicator. However, channel processor 72a is coupled only to one shared channel circuit 30a since it is associated with an end detector element 14a of the array 12.

A channel processor receives a logic high signal present indicator from an adjacent channel when a signal is present on the adjacent channel. If the channel receiving a logic high signal present indicator also detects a signal (i.e., if the output signal of the A/D converter is 01, 10, or 11), then signal coupling is determined to have occurred. Recall that a logic high signal present indicator generally will be received from only one adjacent channel at a given time since the likelihood of signal coupling among more than two channels is negligible. In response to receipt of a logic high signal present indicator on a channel also detecting a signal, the channel processor directs the digital output signal to the shared channel circuit which is coupled to both the receiving channel and the adjacent channel from which the logic high signal present indicator was received.

Consider an example where signal coupling occurs between channels 24a and 24b. In this case, the channel processor 72a receives a logic high signal present indicator 32b from channel 24b. In response to this signal present indicator, the switch 74a of channel processor 72a is positioned to couple the digital signal detected on channel 24a to the shared channel circuit 30a which channel 24a shares with channel 24b via signal line 75a. Likewise, channel processor 72b receives a logic high signal present indicator 32a from channel 24a and, as a result, the switch 74b is positioned to couple the digital signal detected on channel 24b to shared channel circuit 30a which channel 24b shares with channel 24a via signal line 71b.

It will now be apparent that in the absence of signal coupling, a channel processor 72a–72n directs the digital signal directly to the counter 40a–40x of the respective channel; whereas, in the presence of signal coupling, the channel processor 72a–72n directs the digital signal to a shared channel circuit. Thus, a shared channel circuit 30a–30i receives either two input signals (i.e., non-zero input signals) in the presence of signal coupling or receives no input signals (i.e., zero input signals) in the absence of signal coupling.

One illustrative logic circuit 90b for implementing logic circuits 90a–90c to control the switches 74a–74c, respectively, is shown in FIG. 2A to include inverters 76, 78 and AND gates 84, 86, and 88 coupled as shown. The illustrated logic circuit 90b of channel 24b is responsive to signal present indicators 32a and 32c from adjacent channels 24a and 24c, respectively. A logic high signal on the output of AND gate 84 causes the switch 74b to be in a first position to couple the digital output signal to shared channel circuit 30a via signal line 71b, a logic high output of AND gate 86 causes the switch 74b to be in a second position to couple the digital output signal to counter 40e via signal line 73b, and a logic high output of AND gate 88 causes the switch 74b to be in a third position to couple the digital output signal to shared channel circuit 30b via signal line 75b. Only one of the AND gates 84, 86, and 88 will have a logic high output signal at a given time. Table I illustrates the output state of AND gates 84, 86, and 88 in response to the possible states of signal present indicators 32a and 32c.

TABLE I

| Signal 32a | Signal 32c | Output of gate 84 | Output of gate 86 | Output of gate 88 |
|---|---|---|---|---|
| 0 | 0 | 0 | 1 | 0 |
| 0 | 1 | 0 | 0 | 1 |
| 1 | 0 | 1 | 0 | 0 |
| 1 | 1 | 0 | 0 | 0 |

As will be apparent from consideration of Table I, a logic high signal present indicator 32a from channel 24a will cause the switch 74b to couple the digital output signal to shared channel circuit 30a and a logic high signal present indicator 32c from channel 24c will cause the switch 74b to couple the digital output signal to shared channel circuit 30b. If neither signal present indicator is high, then the switch couples the digital output signal 70b to counter 40e, as is desired in the absence of signal coupling. Since an indication of signals on both neighboring channels is very unlikely as discussed above, this condition results in a logic high signal level at the output of none of gates 84, 86, and 88, thereby causing no change in the position of switch 74b. The entries in Table I for signal 32a and 32b shown as logic high or one indicate signal present and as logic low or zero indicate signal absent; the signal present indicator is also a signal absent indicator and these two terms can be used interchangeably. For clarity, we use the term signal present but either concept is implied; what is required is only a determination that signal coupling is present (or absent).

Each shared channel circuit 30a–30i is coupled to at least one counters 40a –40x. In the illustrative embodiment, each shared channel circuit is coupled to three counters; an upper counter, a center counter and a lower counter. For example, shared channel circuit 30a is coupled to (1) upper counter 40b by a two bit signal line 81a; (2) center counter 40c by a two bit signal line 83a; and (3) lower counter 40d by a two bit signal line 85a. Each such signal line is comprised of two individual signal lines, one carrying the most significant bit of the two bit digital word and the other carrying the least significant bit. Since each counter generates an image signal for coupling to a respective image sub-pixel, each shared channel circuit is associated with three sub-pixels.

As noted above, in response to receipt of input signals, the shared channel circuit 30a–30i generates an output signal and directs the output signal to a selected counter. In the embodiment of FIG. 2, the shared channel circuit combines the received signals by summing them together in order to generate the output signal. In this way, the amplitude of the received signal, which was essentially divided between two detector elements upon receipt, is reconstructed. Also, the shared channel circuit compares the amplitude of the received signals and if they are unequal, directs the combined output signal to the counter closest to the channel on which the input signal having the greater amplitude was received. If the received signals are equal, the shared channel circuit directs the combined output signal to the center counter. It should be noted that summing or comparison can be accomplished by analog or digital circuit implementations and that digital circuits that simply receive ones or zeros and produce ones or zeros can effectively perform summing or comparison operations. All such implementations are within the scope of the invention.

Since there are four times as many counters, and thus sub-pixels, as detector elements, the illustrated embodiment improves output image resolution by a factor of four, for an increase of 300%. Greater resolution improvement may be achieved by providing additional counters coupled to each shared channel circuit and lesser resolution improvement may be achieved by providing fewer counters coupled to each shared channel circuit. For example, a single counter may be coupled to each shared channel circuit in order to achieve a two times resolution improvement. In this case, it will be apparent that the shared channel circuits need not compare the amplitude of the received signals since regardless of their relative amplitudes, the output signal will be directed to the single counter to which the circuit is coupled.

The operation of the shared channel circuits 30a–30i is illustrated by the entries in Table II low which lists, for each combination of input signals to an exemplary shared channel circuit 30a, the value of the three output signals. It should be noted that in each case, only one of the three outputs signals 81a, 83a, and 85a is non-zero, which assures that only one of the counters 40b, 40c, and 40d receives a non-zero input. For example, on the first line of Table II, both inputs, signals 75a and 71b are 01 and their binary sum, 10, appears on signal 83a which couples to and increments the center counter 40c by 10 (i.e., two counts). On the second line, the lower signal 71b is 10, which is larger than upper signal 75a, and their binary sum 11 appears on signal 85a which couples to and increments the lower counter 40d by 11 (i.e., three counts). A similar situation arises on the third line where it is recognized that use of only two bits in the A/D converter implies that the maximum sum is 11. The fourth line is similar to the second with upper replaced by lower and the remaining lines all use the fact that 11 is the largest output permitted by the two-bit A/D converter.

TABLE II

| Inputs to shared channel circuit 30a | | Outputs from shared channel circuit 30a | | |
|---|---|---|---|---|
| Signal 75a | Signal 71b | Signal 81a | Signal 83a | Signal 85a |
| 01 | 01 | 00 | 10 | 00 |
| 01 | 10 | 00 | 00 | 11 |
| 01 | 11 | 00 | 00 | 11 |
| 10 | 01 | 11 | 00 | 00 |
| 10 | 10 | 00 | 11 | 00 |
| 10 | 11 | 00 | 00 | 11 |
| 11 | 01 | 11 | 00 | 00 |
| 11 | 10 | 11 | 00 | 00 |
| 11 | 11 | 00 | 11 | 00 |

One illustrative shared channel circuit 30a for achieving the operation illustrated by Table II is shown in FIG. 2B to includes NAND gates 92–104, inverters 106–112, and inverter plus OR gates 114–120, which also function as NAND gates, coupled as shown. More particularly, each of the two bit digital signals 75a and 71b is broken down into a MSB signal and a LSB signal. Likewise, each output signal 81a, 83a, and 85a is shown to include a MSB signal and a LSB signal.

Note that other input signal states not listed in Table II are not expected to occur. Specifically, it is not expected that a shared channel circuit will receive a non-zero signal from one processing circuit and a zero signal from another processing circuit. However, should this condition occur, consideration of the circuit of FIG. 2B reveals that all output signals 81a, 83a, and 85a provided by the circuit 30a are zero. When a shared channel circuit receives a zero signal from both of its associated processing circuits, all of the output signals 81a, 83a, and 85a are also zero.

Another type of signal combining which may be performed is a combination of summing and weighting. In this case, the summing is performed by the shared channel circuit as discussed above. The weighting may be performed in the shared channel circuit or alternatively, may be performed in the A/D converter 62a–62c using techniques discussed in the above-referenced U.S. patent application Ser. No. 09/977,132. It will be appreciated that in embodiments in which signal weighting is performed, the manner in which the shared channel circuits 30a–30i direct the summed and weighted output signal to an appropriate counter may be "reversed" since the weighting operation may provide heavier weighting for low amplitude signals and lighter weighting for high amplitude signals. Thus, upon comparison of weighted signal amplitudes by the shared channel circuit, the output signal may be directed to the counter closest to the channel from which the lower weighted amplitude signal was received (rather than to the counter closest to the channel from which the higher amplitude signal was received, as is done in the above-discussed non-weighting case).

Figure 3:
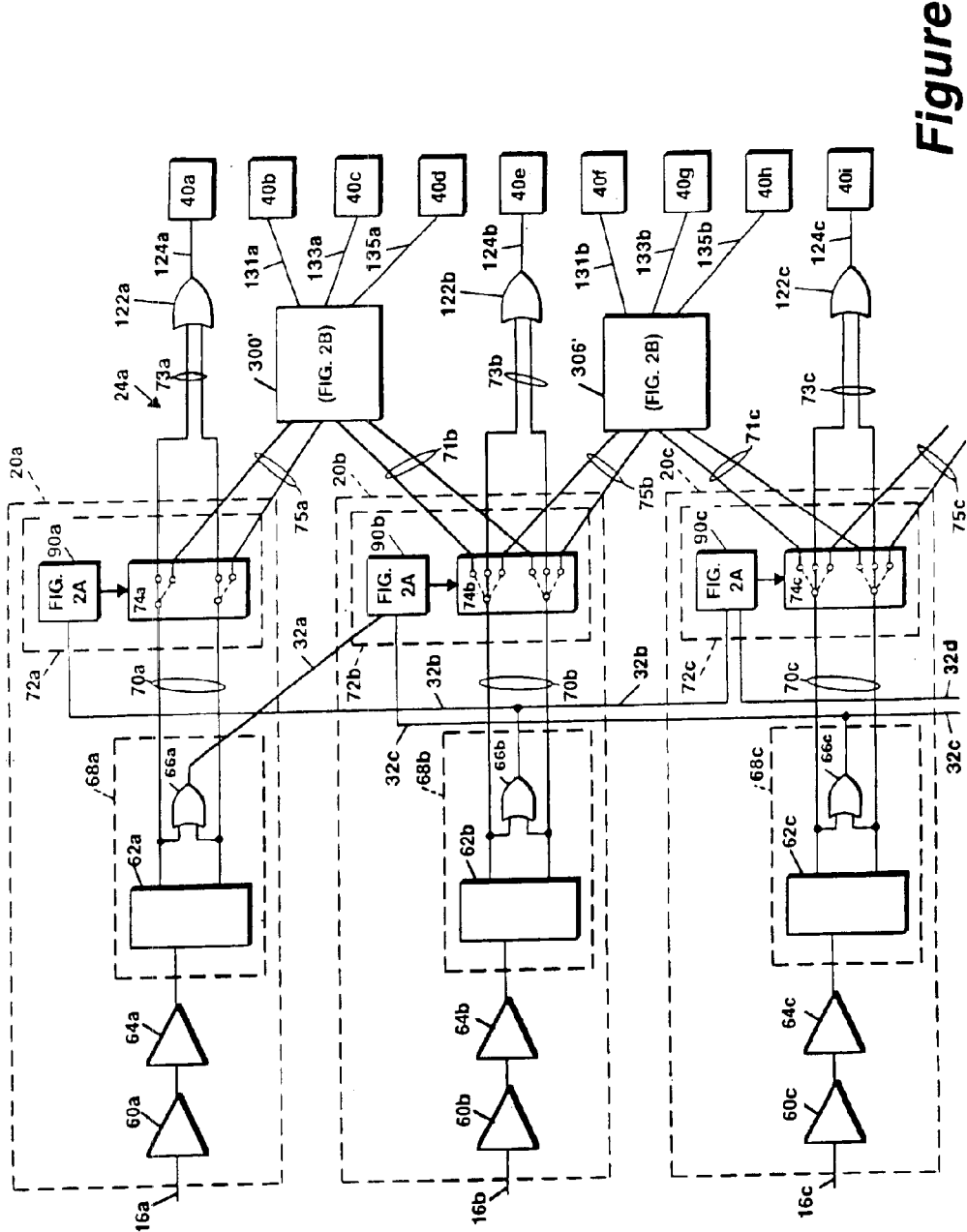
FIG. 3 is a schematic of alternative processing circuitry for use in a photon counting implementation of the system of FIG. 1.

The imaging system 10 of FIG. 1 can employ photon counting by making certain modifications to the processing circuitry of FIG. 2, as is shown in FIG. 3. In particular, three channels 24a, 24b and 24c of processing circuitry are shown to include processing circuits 20a, 20b, and 20c which are substantially identical to processing circuits 20a, 20b, and 20c shown and described above in conjunction with FIGS. 2 and 2A. Thus, each processing circuit 20a–20c converts the respective detector output signal 16a–16c into a digital signal 70a–70c, generates a signal present indicator 32a–32c for coupling to adjacent channels, and directs the digital signal to either a counter associated with the respective channel in the absence of signal coupling or to a shared channel circuit 30a'–30b' in the presence of signal coupling.

In the embodiment of FIG. 3, in the absence of signal coupling, the two bit digital signal on line 73a–73c is coupled to the respective counter through an OR gate 122a–122c, as shown. In this way, the input to the counter is a single bit which is high so as to increment the counter by one count when either bit of the digital signal 73a–73c is high. Thus, whenever a signal is received which exceeds the lowest threshold of the A/D converter 62a–62c, a one is provided on signal line 124a–124c to increment the respective counter 40a, 40e, 40i, respectively, thereby providing a "straight-through" path in the absence of signal coupling.

The shared channel circuits 30a'–30i' operate generally as described above in conjunction with shared channel circuits 30a–30i of FIG. 2 to receive the digital output signals 71a–71c and 75a–75c from two adjacent channels in the presence of signal coupling, generate an output signal and direct the output signal to a counter. However, the output signal of the shared channel circuits 30a'–30b' is a single bit signal, with a one causing the respective counter to be incremented by a single count, thereby implementing photon counting.

Here again, each shared channel circuit 30a'–30b' is coupled to three counters, although more or less counters may be used depending on the desired resolution improvement, the improvement permitted by the detector characteristics, and acceptable circuit complexity. For example, illustrative shared channel circuit 30a' is coupled to (1) an upper counter 40b by signal line 131a; (2) a center counter 40c by signal line 133a; and (3) a lower counter 40d by a signal line 135a, as shown.

Considering illustrative shared channel circuit 30a', in the presence of signal coupling, the shared channel circuit 30a' compares the amplitude of the received signals 75a and 71b and directs the output signal to the counter nearest the channel generating the greater signal amplitude or to the center counter if the amplitudes are equal. In other words, if the amplitude of signal 75a is greater than signal 71b, then a logic high output signal is provided on signal line 131a to increment counter 40b. If signal 71b is greater than signal 75a, then counter 40d is incremented and if these two signals are equal, then counter 40c is incremented. Since amplitude reconstruction is not performed in this photon counting embodiment, the digital signals 75a and 71b are not combined in the shared channel circuit. Rather, the output signal is simply a single logic high bit so that the appropriate counter is incremented once for the received photon. Table III below lists the output signals provided by illustrative shared channel circuit 30a' in response to different combinations of input signals 75a and 71b.

TABLE III

| Inputs to shared channel circuit 30a' | | Outputs from shared channel circuit 30a' | | |
|---|---|---|---|---|
| Signal 75a | Signal 71b | Signal 131a | Signal 133a | Signal 135a |
| 01 | 01 | 0 | 1 | 0 |
| 01 | 10 | 0 | 0 | 1 |
| 01 | 11 | 0 | 0 | 1 |
| 10 | 01 | 1 | 0 | 0 |
| 10 | 10 | 0 | 1 | 0 |
| 10 | 11 | 0 | 0 | 1 |
| 11 | 01 | 1 | 0 | 0 |

TABLE III-continued

| Inputs to shared channel circuit 30a' | | Outputs from shared channel circuit 30a' | | |
| --- | --- | --- | --- | --- |
| Signal 75a | Signal 71b | Signal 131a | Signal 133a | Signal 135a |
| 11 | 10 | 1 | 0 | 0 |
| 11 | 11 | 0 | 1 | 0 |

Figure 3A:
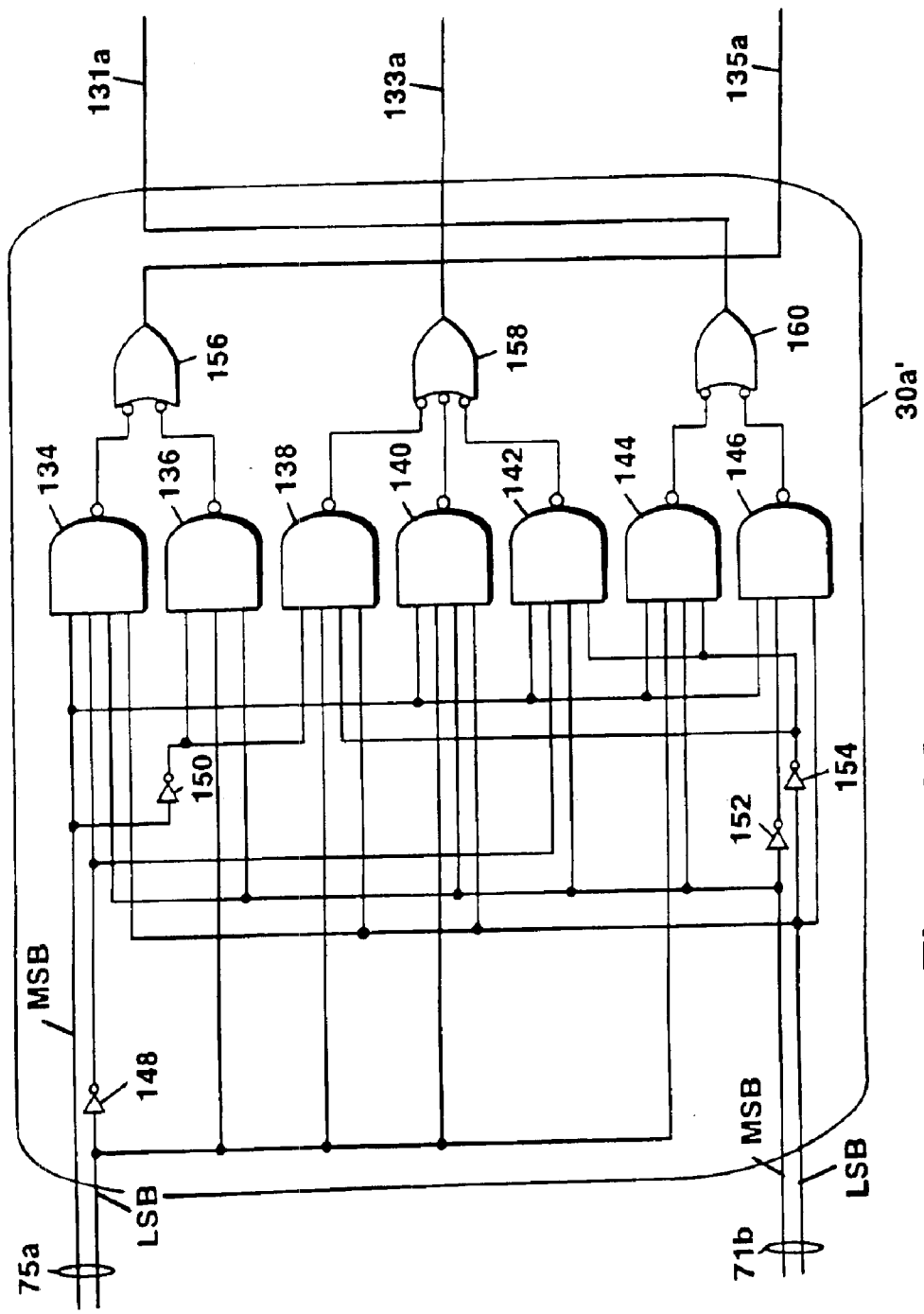
FIG. 3A is a schematic of an illustrative shared channel circuit of FIG. 3.

Referring also to FIG. 3A, one illustrative circuit is shown for implementing the logic of Table III. The shared channel circuit 30a' includes NAND gates 134–146, inverters 148–154, and inverter plus OR gates 156–160, which also function as NAND gates, coupled as shown.

Note that other signal states not listed in Table III are not expected to occur. Specifically, it is not expected that a shared channel circuit will receive a non-zero signal from one processing circuit 20a–20n and a zero signal from another processing circuit. However, should this condition occur, consideration of the circuit of FIG. 3A reveals that all of the output signals 131a, 133a, and 135a are zero. When a shared channel circuit receives a zero signal from both of its associated processing circuits, all of the output signals 131a, 133a, and 135a are zero.

It will be appreciated by those of ordinary skill in the art that signal coupling may occur to a greater or lesser degree depending on the physical configuration of the detector array 12 and/or the size of the bias voltage which affects the degree of diffusion in the detector elements. If signal coupling seldom occurs, then counters coupled to a shared channel circuit (e.g., counters 40b, 40c, 40d coupled to circuit 30a in FIG. 2) would seldom accumulate data; and their associated image sub-pixels may appear dim. Or if signal coupling almost always occurs, then counters coupled to a processing circuit 20a–20n (e.g., counter 40a) would seldom accumulate data; and its associated image sub-pixel may appear dim. Techniques for mitigating these effects may be implemented in various ways and are referred to generally as image compensation. As one example, image compensation may be implemented in the computer 54 of FIG. 1.

One image compensation technique is the adjustment of signal amplitude in each image sub-pixel according to predetermined rules. These rules may be developed by knowledge of the physical configuration and operating parameters of the detector array 12, particularly its signal coupling characteristics. Such rules may be developed, or at least verified, by measurements of known objects whose images are known; in the medical x-ray field these objects are usually called phantoms.

Another form of image compensation is the adjustment of the size and/or shape of the image sub-pixels. The design of the optimum size and shape for the image sub-pixels is achieved by modeling and/or measurement of the detector array. For example, for a silicon strip detector with high biasing voltage resulting in overdepletion, measurement results as reported in a paper by M. Lundqvist, et al. entitled "Computer Simulations and Performance Measurements on a Silicon Strip Detector for Edge-On Imaging", IEEE Transactions on Nuclear Science, Vol. 47, No. 4, page 1489, August 2000, show charge sharing limited to detector regions near (approximately ± 10$\mu$) the midpoint between readout elements. For widely spaced readout elements, e.g., 100$\mu$, this implies that "straight through" counters (e.g., counter 40a) would accumulate most of the data, counter 40c in exemplary channel 24a would accumulate some data, and counters 40b and 40d would accumulate little or no data. Thus, the image sub-pixel associated with counter 40a should be relatively large, that associated with counter 40c should be smaller, and those associated with counters 40b and 40d should be very small or they and their supporting hardware may even be omitted. As a further example, in a detector with lower biasing voltage and more closely spaced readout elements (e.g., 25 or 40$\mu$) in which all counters are expected to accumulate substantially equal amounts of data, the sub-pixels should be substantially uniform in size. In image display, the amplitude can always be adjusted; adjustment of pixel size and shape may only be feasible on zoom-in versions of images because of resolution limitations of display mechanism 56 in FIG. 1. That is, the full size image (non-zoom-in) may require as many display resolution elements as the display mechanism can support; for the same number of pixels, adjustment of pixel size and shape requires more display resolution elements than standard, same size pixels.

The need for image compensation may be eliminated by forcing all of the counters 40a–40x to accumulate substantially equal amounts of data. This can be achieved by unevenly spacing the thresholds of the A/D converters 62a–62n (FIGS. 2 and 3), as described in the above-referenced U.S. patent application Ser. No. 09/977,132. By adjusting the threshold between the 01 and 10 output states of the A/D converter and the threshold between the 10 and 11 output states, the relative amounts of data that flow to the counters can be adjusted.

It will be appreciated by those of ordinary skill in the art that the one-dimensional characteristic of the linear detector array 12 simplifies the processing circuitry and techniques described herein by which resolution is improved and the effects of signal coupling are reduced. Of course, as is conventional, the linear array 12 can be used in a slot scan, slit scan, or push broom mode to generate two-dimensional images while still benefiting from the described circuitry and techniques.

Figure 4:
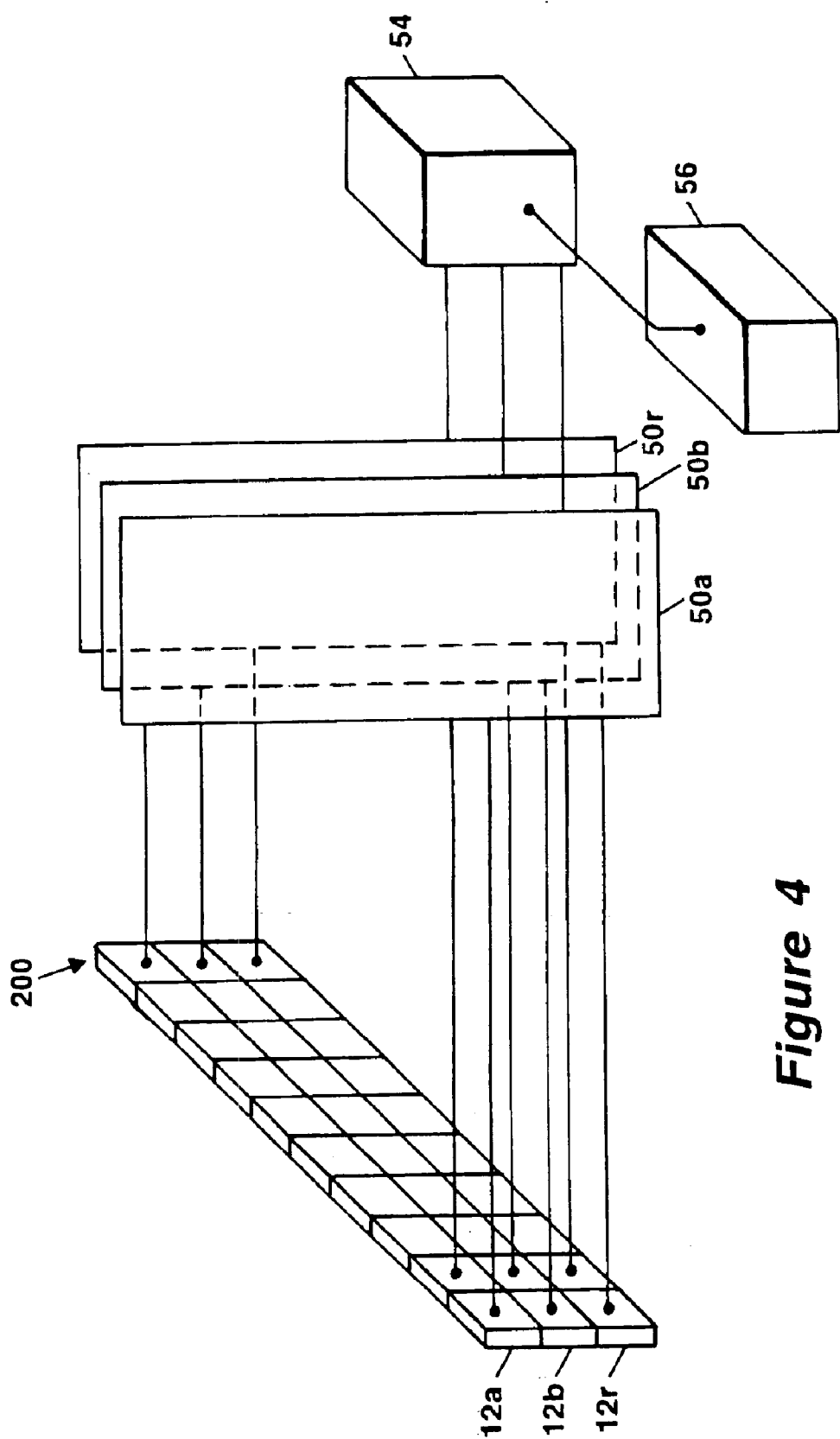
FIG. 4 is a schematic of a two-dimensional electronic imaging system including a detector array which is not susceptible to signal coupling in two dimensions and providing improved resolution and reduced effects of signal coupling according to the invention.

It is possible to provide a two-dimensional detector array which still is susceptible to signal coupling in only one dimension. One such two-dimensional detector array 200 is shown in FIG. 4 and includes a plurality of stacked linear detector arrays 12a–12r, each of the type 12 shown in FIG. 1. Since each row of the detector array 200 is a separate array, isolation between the rows is achieved and signal coupling between rows is prevented.

Each of the linear detector arrays 12a–12r is processed by a processing circuit 50a–50r, respectively, of the type 50 shown in FIG. 1. Thus, detector output signals from the elements of detector array 12a are coupled to a processing circuit 50a, detector output signals from the elements of detector array 12b are coupled to a processing circuit 50b, etc. Because signal coupling can occur in only one dimension, the two-dimensional detector array 200 comprised of individual linear arrays 12a–12r benefits from the simplicity of processing signals where signal coupling can occur in only one dimension.

The output of each processing circuit 50a–50r is coupled to a computer 54 or other post-processing system, element and/or to an operator. As noted above in conjunction with the embodiment of FIG. 1, the functions performed by the computer 54 may include further processing, analysis, and/or storage and may be performed by a variety of computational or processing means depending on the application and may include a sub-pixel size adjustment mechanism and/or a signal amplitude adjustment mechanism. Alternatively, the functions performed by post-processor 54 may be omitted and the data passed directly to a display 56 or other system element.

Figure 5:
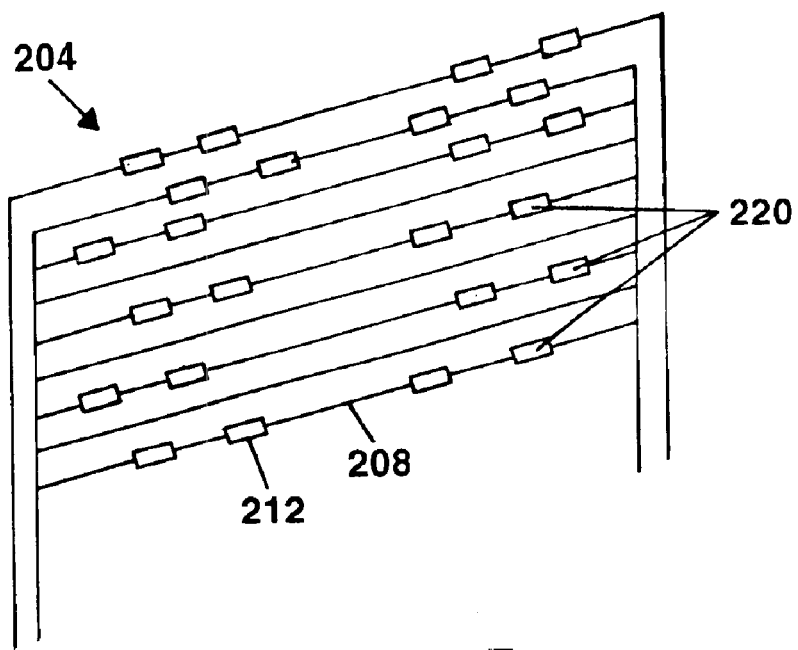
FIG. 5 shows the p-side of a silicon microstrip detector array suitable for use with the processing circuitry of FIGS. 2 and 3.
Figure 5A:
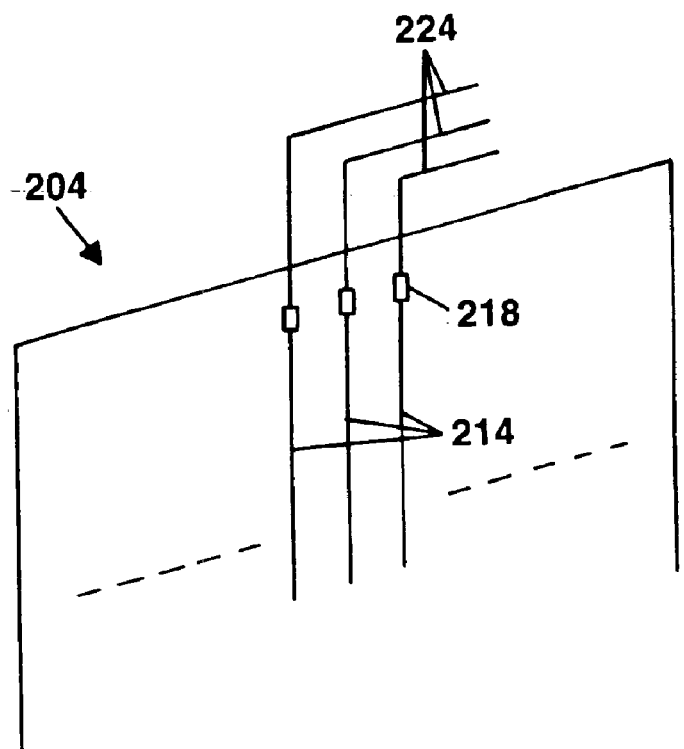
FIG. 5A shows the n-side of the silicon microstrip detector of FIG. 5.

An alternative two-dimensional detector array 204 which can utilize the relatively simple processing circuitry 50 of FIG. 1 is shown in FIGS. 5 and 5A. FIG. 5 shows the p-side of a silicon microstrip detector where horizontal readout strips 208 and associated bonding pads or attachment areas 212 provide a signal readout for a photon arrival anywhere on a horizontal area near one or more (usually only two) readout strips. FIG. 5A shows the other side, the n-side of the silicon microstrip detector where vertical readout strips 214 and attachment areas 218 provide signal readouts for a photon arrival anywhere on a vertical area near one or more (usually only two) vertical readout strips. The intersection of a horizontal and vertical area effectively provides a detector element, or pixel. Since on the p-side the bonding pads form a one-dimensional array, the overall arrangement of FIG. 1 applies and the three connection mechanisms, or detector output signals 220 of FIG. 5 can be viewed as connecting to three of the five processing circuits 20a, 20b, 20c, 20m, and 20n shown in FIG. 1. Likewise, since on the n-side the attachment points form another one-dimensional array, the overall arrangement of FIG. 1 applies and the three connection mechanisms, or detector output signals 224 of FIG. 5A can be viewed as connecting to a different set of three processing circuits like the processing circuits 20a–20n shown in FIG. 1.

For this type of silicon microstrip detector 204, a relatively high sampling rate of outputs from the detector array is required in order to isolate single photon or particle arrivals since a single arrival must occur, not just in the intersection of the horizontal and vertical areas but in any part of both areas. This is true because a photon arrival anywhere near a horizontal strip 208 produces a detector output signal 220 and a photon arrival anywhere near a vertical strip 214 produces a detector output signal 224; multiple photon arrivals between sampling times can be avoided by increasing the sampling rate. Thus, this type of detector is best suited to relatively low photon or particle arrival rates.

Figure 6:
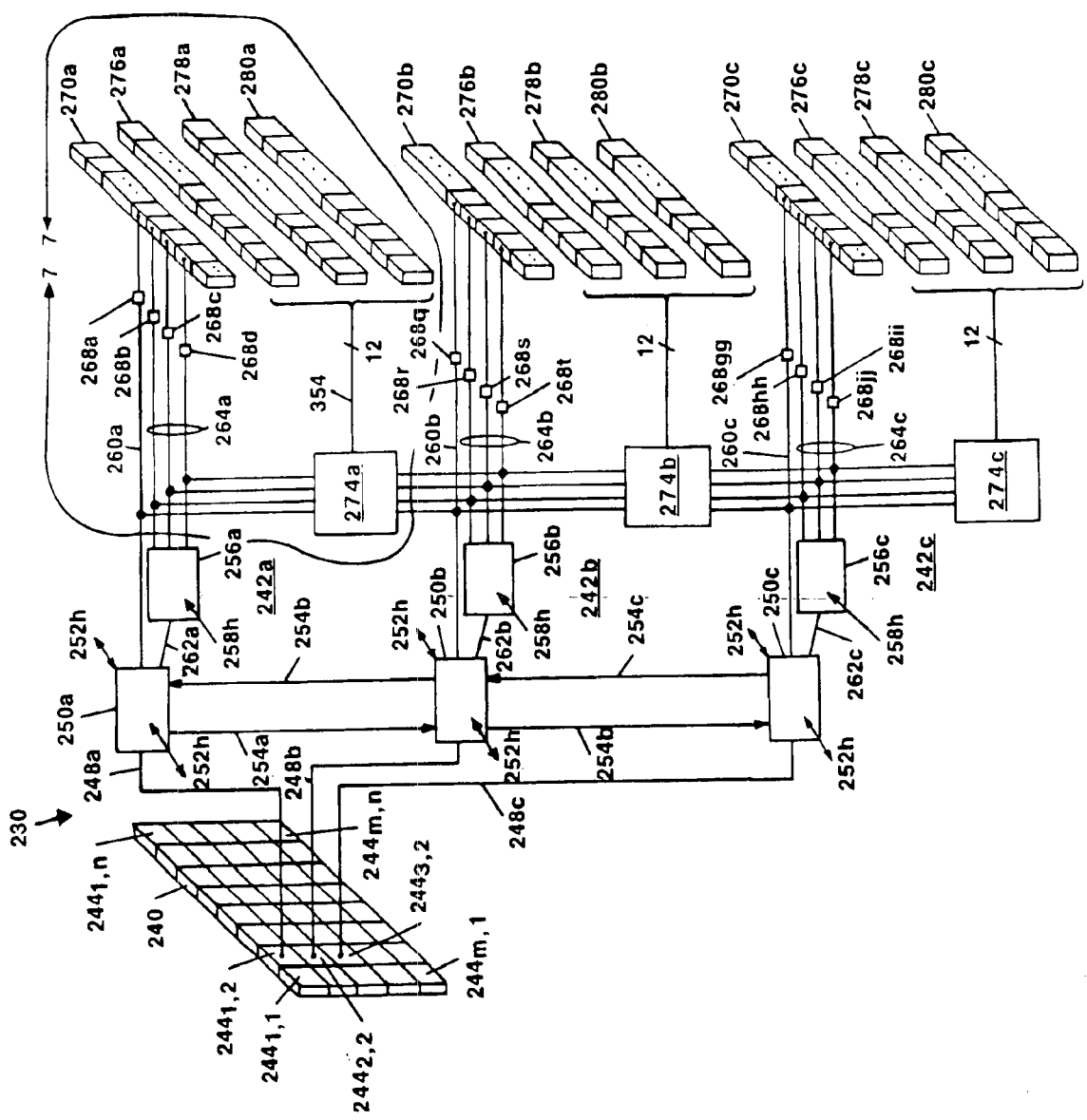
FIG. 6 is a schematic of an alternative two-dimensional electronic imaging system including a detector array which is susceptible to signal coupling in two dimensions and providing improved resolution and reduced effects of signal coupling according to the invention.
Figure 7:
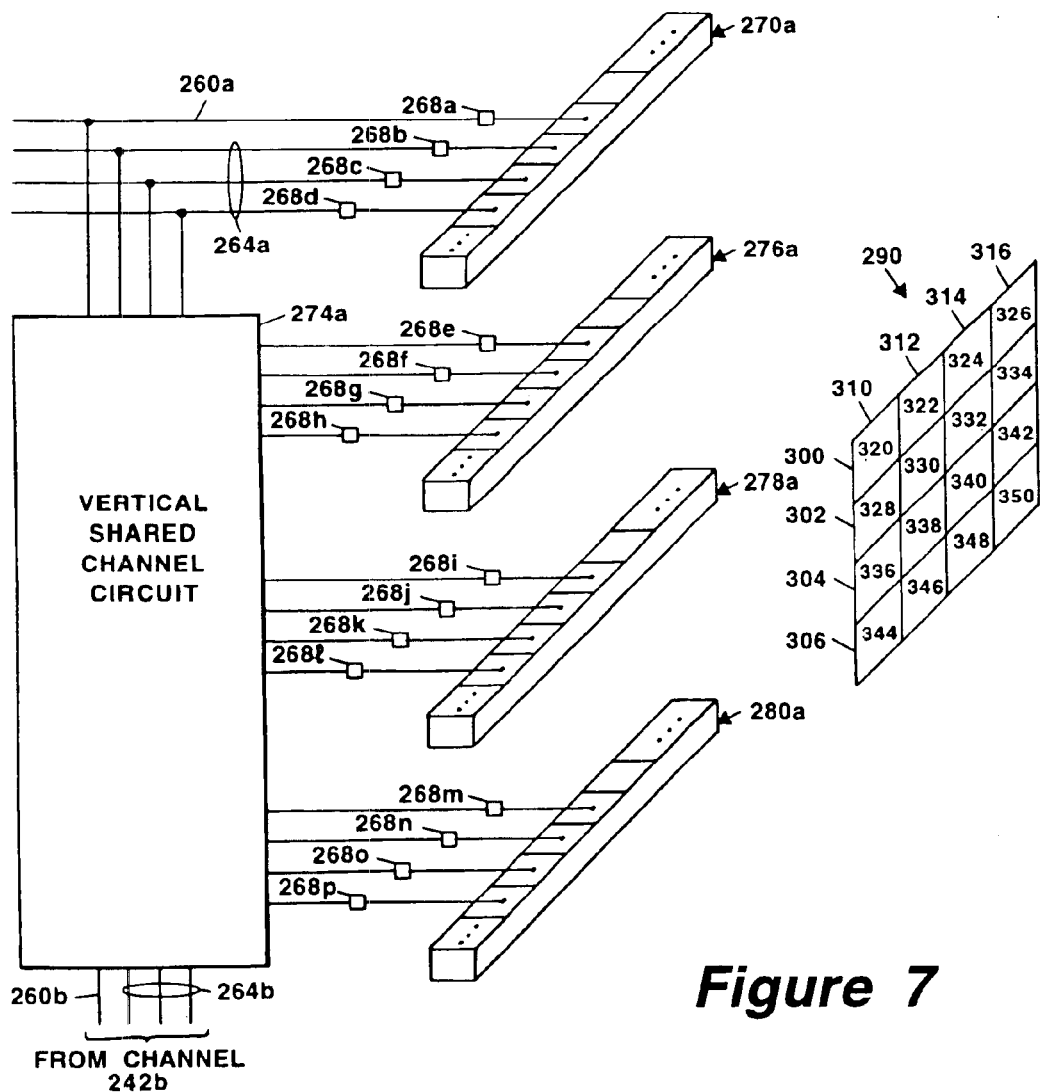
FIG. 7 is a more detailed schematic of a portion of the imager of FIG. 6.

In certain types of two-dimensional detector arrays, signal coupling may occur in more than one dimension, as is the case in the detector array 240 shown in FIGS. 6 and 7. Since energy from a photon or particle arrival can cross couple both horizontally and vertically in any ratio, significant signal cross coupling can occur and cause outputs on adjacent detector elements in the horizontal, vertical or diagonal directions.

Referring now to FIG. 6, an electronic imager 230 includes a two-dimensional detector array 240 having a plurality of detector elements $244_{1,1}$–$244_{m,n}$ arranged in m columns and n rows, as shown. The processing circuitry of the imager 230 includes a plurality of channels 242a–242mxn, each of which accepts a signal from at least one detector element $244_{1,1}$–$244_{m,n}$ and includes a processing circuit 250a–250mxn for processing the respective input signal(s). The processing of detector output signals will be described in conjunction with processing of signals 248a, 248b, and 248c from vertically arranged detector elements $244_{1,2}$, $244_{2,2}$, and $244_{3,2}$ in channels 242a, 242b, and 242c, respectively.

Each detector output signal 248a, 248b, and 248c is coupled to a respective processing circuit 250a, 250b, 250c which is substantially identical to processing circuits 20a–20c of FIG. 1. Thus, each processing circuit 250a–250c may contain an amplifier, shaper and an A/D converter circuit like circuits 62a–62c of FIG. 2 for converting the input signal into a digital signal and a logic circuit like OR gate 66a–66c of FIG. 2 for generating a signal present indicator 254a–254c which is substantially identical to signal present indicator 32a described above in conjunction with FIG. 2. The signal present indicator 254a–254c thus indicates whether or not a signal has been received on the respective channel and is coupled to adjacent channels in the vertical direction in order to permit a determination to be made as to whether signal coupling has occurred in the vertical direction. In the two-dimensional embodiment of FIG. 6, each processing circuit 250a–250c couples its signal present indicator both to horizontally neighboring channels and to vertically neighboring channels. Thus, for example, the signal present indicator generated in channel 242b is coupled to the processing circuit 250a of channel 242a via signal line 254b, to the processing circuit 250c of channel 242c via signal line 254b, and also to the processing circuits (not shown) associated with horizontally neighboring detector elements $244_{2,1}$ and $244_{2,3}$ via signal lines 252h. The signal present indicators sent to and received by processing circuits of horizontally neighboring channels are labeled 252h. The sampling interval of each processing circuit 250a–250c is short enough that no more than one signal event is likely to occur on a particular channel during the sampling interval including an event with no signal coupling, an event with coupling in the vertical direction, an event with coupling in the horizontal direction or an event with coupling in both the horizontal and vertical directions. That is, the probability of a plurality of such events occurring in a sampling interval is negligibly small.

Processing circuits 250a–250c of FIG. 6 further include a channel processor similar to the channel processor 72a–72c of processing circuits 20a–20c of FIG. 2 for determining, based on received signal present indicators, whether or not signal coupling has occurred. In the absence of signal coupling, the channel processor directs the digital signal directly to a counter 268 associated with the respective channel; whereas, in the presence of horizontal signal coupling, the channel processor directs the digital signal to a shared channel circuit 256a–256c (like circuits 30a–30c of FIG. 2, and hereinafter referred to as horizontal shared channel circuits) to which it is coupled via a signal line 262a–262c. Each of the horizontal shared channel circuits 256a–256c thus, additionally receives an input, labeled 258h, from a horizontally adjacent channel. For example, horizontal shared channel circuit 256a receives, in addition to the digital signal from processing circuit 250a via signal line 262a, a digital signal 258h from the processing circuit associated with horizontally adjacent pixel $244_{1,1}$. Like circuits 30a–30c of FIG. 2, illustrative horizontal shared channel circuit 256a determines which of its input signals 262a, 258h has the greater amplitude (and optionally also sums the two input signals in embodiments implementing amplitude reconstruction), and directs an output signal to a counter 268b, 268c, or 268d to which it is coupled as long as no vertical signal coupling has occurred. Thus, with no vertical signal coupling, if signal coupling occurs with respect to two horizontally neighboring channels, then a signal is coupled to one of counters 268b, 268c, and 268d; whereas, if no such horizontal signal coupling occurs, then a signal is coupled to counter 268a.

In view of the above discussion, it should now be apparent that signal coupling in the horizontal direction is handled in the same manner as that described above in conjunction with FIGS. 1 and 2 in applications employing amplitude reconstruction or in the manner described above in conjunction with FIGS. 1 and 3 in the case of photon counting.

Additional circuitry in the form of vertical shared channel circuits 274a–274c, shift registers 276a–276c, 278a–278c, and 280a–280c, and associated counters is provided for handling signal coupling in the vertical direction. Although not shown in FIG. 6 for simplicity of illustration, the shift registers 270a–270c, 276a–276c, 278a–278c, and 280a–280c are coupled to an optional post-processor, like computer 54 of FIG. 1 and further to a display, like display 56 of FIG. 1 comprising a plurality of image sub-pixels.

The vertical shared channel circuits 274a–274c operate on the same general principals as their horizontal counterparts (i.e., the horizontal shared channel circuits 256a–256c) to generate an output signal and direct the output signal to a selected counter associated with a selected image sub-pixel. As shown, signal lines 260a–260c and collective signal lines 264a–264c are coupled to the vertical shared channel circuits 274a–274c such that each circuit can receive signals 260a–260c and signals 264a–264c from the two vertically adjacent channels.

More particularly, at any given time, data is directed on one of signal lines 260a–260c and 264a–264c directly to the respective counter in the absence of vertical signal coupling or to the vertical shared channel circuit connected to the two channels on which signals were detected when vertical signal coupling has occurred. In the presence of vertical signal coupling, data is passed to the vertical shared channel circuit and, in the absence of vertical signal coupling, data is passed to the respective counter. For example, if vertical signal coupling occurs between channels 242a and 242b, then channel 242a data is passed either on line 260a or one of lines 264a to vertical shared channel circuit 274a rather than to one of counters 268a, 268b, 268c, and 268d. Likewise, in channel 242b, data is passed either on line 260b or one of lines 264b to vertical shared channel circuit 274a rather than to one of counters 268q, 268r, 268s, and 268t. In the absence of vertical signal coupling, the data on whichever channel received a signal is passed directly to the counters, such as counters 268a–268d in the case of channel 242a, rather than to a vertical shared channel circuit. The determination as to whether or not vertical signal coupling has occurred is based on the signal present indicators 254a–254c. It will be appreciated by those of ordinary skill in the art that the signals 260a–260c and 264a–264c may be directed as described by the use of switches under the control of a logic circuit responsive to vertical signal present indicators 254a–254c.

Referring also to FIG. 7, a portion of the imager 230 taken along line 7—7 of FIG. 6 is shown in greater detail. Also shown in FIG. 7 is a portion 290 of an image generated by imager 230 which corresponds to a single detector element $244_{1,2}$. The image portion 290 contains rows 300, 302, 304, and 306 as well as columns 310, 312, 314, and 316 of sub-pixels 320–350.

The illustrative vertical shared channel circuit 274a provides twelve output signals, labeled 354 collectively (FIG. 6), each coupled to a respective counter 268e–268p, which counter is further coupled to a cell of a respective shift register 276a, 278a, and 280a, as shown. These shift registers, along with shift register 270a which holds information from situations where no vertical signal coupling occurs, are coupled through an optional post-processor to a display containing sub-pixels 320–350, each associated with a counter 268a–268p, respectively.

The processing of detector output signals in order to determine whether or not horizontal signal coupling has occurred, to generate an appropriate image signal and to direct the image signal to the appropriate image sub-pixel is as discussed in conjunction with FIGS. 1–3. Such horizontal processing results in the selection of an image sub-pixel column. Specifically, in the absence of horizontal signal coupling, the image signal is displayed on image column 316 and, in the presence of horizontal signal coupling, the image signal is displayed on a selected one of image columns 310, 312, and 314, depending on the relative strength of the signals on the horizontally adjacent channel associated with detector element $244_{1,1}$ which shares horizontal shared channel circuit 256a.

Given the selection of image column based on processing signals from horizontally adjacent channels, the vertical shared channel circuits 274a–274c refine the selection of image sub-pixel to a particular row 300, 302, 304, or 308. In the absence of vertical signal coupling, the image signal appears on a sub-pixel in image row 300 and, in the presence of vertical signal coupling, the image signal appears on a sub-pixel in one of rows 302, 304, and 306, depending on the relative strength of the signals on the vertically adjacent channels 242a and 242b which share vertical shared channel circuit 274a.

A vertical shared channel circuit 274a–274c either receives no inputs (i.e., only zeros) in the absence of vertical signal coupling or it receives inputs (i.e., non-zero signals) from both of the vertically adjacent channels coupled to the vertical shared channel circuit in the presence of vertical signal coupling. When the vertical shared channel processor 274a receives two non-zero inputs, they will arrive with horizontal sub-pixel already selected, as is determined by which of the four connection mechanisms they arrive on (e.g., either line 260a or one of the three signal lines comprising line 264a). If the two non-zero inputs are received on corresponding lines indicating that the two vertically adjacent channels selected the same image column, then that column is selected. Alternatively, the amplitude of the two received signals is compared and the sub-pixel column is determined by the channel carrying the signal having the greater amplitude. In other words, if a non-zero signal is received by processor 274a from channel 242a on one of the signal lines 264a corresponding to display column 314 and a non-zero signal is received by processor 274a from channel 242b on one of the three signal lines 264b corresponding to one of sub-pixel columns 310 or 312, then whichever signal has the greater amplitude determines the sub-pixel column. For example, if the signal from channel 242a has a greater amplitude than the signal from channel 242b, then sub-pixel column 314 is selected.

A vertical shared channel circuit, such as the illustrated processor 274a, which receives non-zero signals determines the vertical sub-pixel (i.e., the image row) and amplitude allocation using the same methods as discussed in connection with FIGS. 1–3. Thus, the generation and vertical or row allocation of the output signal (e.g., in the form of a logic one in a photon counting embodiment or a summed signal in an amplitude reconstruction embodiment) is based on equality of the signals or on which of the two shared channels received the stronger signal.

Stated differently, in the presence of vertical signal coupling, a vertical shared channel circuit, such as illustrative circuit 274a, selects one of image rows 302, 304, and 306, depending on the relative strength of the received signals. If the signal amplitude is equal, then image row 304 is selected. If the amplitude of the signal from channel 242a is greater than the amplitude of the signal from channel 242b, then row 302 is selected. And, if the amplitude of the signal from channel 242*b* is greater than the amplitude of the signal from channel 242*a,* then row 306 is selected. Having selected a sub-pixel column and row, the appropriate sub-pixel is thus determined as the element positioned at the intersection of the selected row and column.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

All publications and references cited herein are expressly incorporated herein by reference in their entirety.

What is claimed is:

1. An electronic imager comprising:
   a detector array comprising a plurality of radiation sensitive elements, each representing a pixel and generating a signal in response to incident energy;
   a plurality of processing circuits, each responsive to said signal from a respective radiation sensitive element for providing a first output signal and to a signal present indicator from at least one other processing circuit associated with an adjacent radiation sensitive element for determining whether signal coupling has occurred, wherein each processing circuit is associated with a sub-pixel to which said first signal is coupled in response to a determination that signal coupling has not occurred; and
   a shared channel circuit coupled to at least two processing circuits for receiving said first output signal from the at least two processing circuits in response to a determination that signal coupling has occurred, wherein said shared channel circuit comprises a comparator for comparing the amplitude of said received signals and is operative to generate a second output signal in response to said received signals and to direct the second output signal to a counter associated with a sub-pixel selected in response to said comparison, wherein a plurality of sub-pixels are associated with a pixel.

2. The electronic imager of claim 1 wherein said shared channel circuit comprises a combining circuit for combining said received signals to generate said second output signal.

3. The electronic imager of claim 2 wherein said combining circuit comprises a summing circuit.

4. The electronic imager of claim 1 wherein said detector array comprises a one-dimensional array of radiation sensitive elements.

5. The electronic imager of claim 1 wherein said detector array comprises a multi-dimensional array of radiation sensitive elements.

6. The electronic imager of claim 1 wherein each of said processing circuits comprises an A/D converter for generating said first output signal.

7. The electronic imager of claim 1 further comprising a sub-pixel size adjustment mechanism which adjusts the size of said sub-pixels based on signal coupling characteristics of said detector array.

8. The electronic imager of claim 1 further comprising a signal amplitude adjustment mechanism which adjusts the amplitude of said second output signal based on signal coupling characteristics of said detector array.

* * * * *

UNITED STATES PATENT AND TRADEMARK OFFICE
CERTIFICATE OF CORRECTION

PATENT NO. : 6,884,982 B2  Page 1 of 1
DATED : April 26, 2005
INVENTOR(S) : John U. Beusch It is certified that error appears in the above-identified patent and that said Letters Patent is hereby corrected as shown below:

Column 5,
Line 36, reads "sub-pixels than" and should read -- sub-pixels 40a-40x than --.

Column 10,
Line 49, reads "low" and should read -- below --.

Column 11,
Line 19, reads "includes" and should read -- include --.

Column 18,
Line 31, reads "sub-pixel" and should read -- sub-pixels --.

Signed and Sealed this

Fourth Day of October, 2005

JON W. DUDAS
*Director of the United States Patent and Trademark Office*